(12) United States Patent
Keithley et al.

(10) Patent No.: US 9,678,334 B1
(45) Date of Patent: Jun. 13, 2017

(54) OSCILLATING MIRROR LINE BASED IMAGE TRANSFORMATION

(75) Inventors: Douglas G. Keithley, Boise, ID (US); Gregory L. Unruh, Boise, ID (US)

(73) Assignee: Marvell International Ltd., Hamilton (BM)

(*) Notice: Subject to any disclaimer, the term of this patent is extended or adjusted under 35 U.S.C. 154(b) by 55 days.

(21) Appl. No.: 13/495,882

(22) Filed: Jun. 13, 2012

Related U.S. Application Data

(63) Continuation-in-part of application No. 12/970,628, filed on Dec. 16, 2010, now abandoned.

(60) Provisional application No. 61/496,224, filed on Jun. 13, 2011, provisional application No. 61/289,256, filed on Dec. 22, 2009.

(51) Int. Cl.
*G02B 26/08* (2006.01)
*G02B 26/10* (2006.01)
*B41J 2/44* (2006.01)

(52) U.S. Cl.
CPC .......... *G02B 26/0841* (2013.01); *B41J 2/442* (2013.01); *G02B 26/105* (2013.01)

(58) Field of Classification Search
CPC ..... B41J 2/442; G02B 26/0841; G02B 26/105
USPC ...... 347/111, 112, 129, 224, 225; 359/196.1, 359/197.1, 198.1, 199.1, 199.2, 199.4, 359/212.1, 213.1, 214.1, 223.1, 224.1, 359/224.2
See application file for complete search history.

(56) References Cited

U.S. PATENT DOCUMENTS

| | | | | |
|---|---|---|---|---|
| 5,532,866 | A | * | 7/1996 | Shibata ............... G02B 26/126 206/219 |
| 5,838,479 | A | * | 11/1998 | Shiraishi ................ 359/204.1 |
| 5,966,231 | A | | 10/1999 | Bush et al. |
| 6,178,031 | B1 | | 1/2001 | Rauch et al. |
| 6,856,338 | B2 | | 2/2005 | Takahashi et al. |
| 7,515,169 | B2 | | 4/2009 | Komiya et al. |
| 7,719,558 | B1 | | 5/2010 | Unruh et al. |
| 2004/0160506 | A1 | * | 8/2004 | Maeda ................ G02B 26/122 347/129 |

(Continued)

OTHER PUBLICATIONS

Office Action for U.S. Appl. No. 12/970,628 dated Dec. 28, 2012 (11 pgs).

(Continued)

*Primary Examiner* — Kristal Feggins
*Assistant Examiner* — Kendrick Liu

(57) ABSTRACT

An image forming apparatus performs periodic line based image transformation in order to correct for irregularities in a mirror and for mechanical disturbances that may occur during the rotation of the mirror. The irregularities of the mirror and the mechanical disturbances that occur during the rotation of the mirror may be measured at installation or may be measured during an operation of the image formation apparatus. The characteristics of the mirror are stored as configuration data, which is referenced by a direction of rotation. The image forming apparatus adjusts image data according to the configuration data. The adjustment may occur through data manipulation in stored image data. Alternatively, the adjustment may occur through the control of a pixel rate used to modulate the image data into a transmitted laser beam. The image data may be received by a host device or the image data may be generated by a scanner.

20 Claims, 17 Drawing Sheets

(56) References Cited

U.S. PATENT DOCUMENTS

| | | |
|---|---|---|
| 2005/0275713 A1 | 12/2005 | Kawai |
| 2006/0087695 A1 | 4/2006 | Keithley et al. |
| 2006/0180751 A1* | 8/2006 | Okada ........................... 250/234 |
| 2007/0115339 A1* | 5/2007 | Matsuzaki ............... B41J 2/473 347/118 |
| 2007/0188592 A1* | 8/2007 | Toyama et al. ............... 347/252 |
| 2008/0055392 A1* | 3/2008 | Bush et al. ................... 347/247 |
| 2008/0055393 A1* | 3/2008 | Westerfield et al. ......... 347/259 |
| 2008/0074650 A1* | 3/2008 | Fujihara et al. ............ 356/152.2 |
| 2008/0106776 A1* | 5/2008 | Suzuki et al. ................. 359/199 |
| 2009/0003861 A1* | 1/2009 | Motoyama ......... G03G 15/0415 399/51 |
| 2009/0231606 A1* | 9/2009 | Kawai et al. .................. 358/1.9 |

OTHER PUBLICATIONS

Office Action for U.S. Appl. No. 12/970,628 dated May 7, 2013 (11 pgs).

Office Action for U.S. Appl. No. 12/970,628 dated Nov. 12, 2013 (13 pgs).

\* cited by examiner

OSCILLATING MIRROR LINE BASED IMAGE TRANSFORMATION

CROSS-REFERENCE TO RELATED APPLICATIONS

This application claims the benefit of U.S. Provisional Application No. 61/496,224 filed Jun. 13, 2011, and also is a continuation-in-part of U.S. patent application Ser. No. 12/970,628 filed Dec. 16, 2010, which claims the benefit of U.S. Provisional Application No. 61/289,256 filed Dec. 22, 2009. U.S. Provisional Application No. 61/496,224, U.S. patent application Ser. No. 12/970,628, and U.S. Provisional Application No. 61/289,256 are each hereby incorporated by reference in their entirety.

BACKGROUND

The background description provided herein is for the purpose of generally presenting the context of the disclosure. Work of either of the presently named inventors, to the extent it is described in this background section, as well as aspects of the description that may not otherwise qualify as prior art at the time of filing, are neither expressly nor impliedly admitted as prior art against the present disclosure.

The printing process of a laser printer includes rotating a photoreceptor drum in contact or in close proximity to a sheet of paper or other print media to transfer an image from the photoreceptor drum to the print media. The image is initially communicated to the photoreceptor drum by one or more mirrors that direct a laser beam onto the photoreceptor drum as it rotates. A stream of data turns the laser beam on and off as it sweeps across the photoreceptor drum, leaving a line of static charge that corresponds to a line of the image.

A laser printer or a photocopier may implement a multi-faceted or polygonal rotating mirror to direct a single beam or multiple beams at the photoreceptive drum. The manufacturing of the mirror is not perfect. Facets of the mirror that are not at the ideal length or angle result in distorted images and periodic artifacts in the printed image.

SUMMARY OF THE INVENTION

The present disclosure describes an apparatus that includes a mirror device comprising a mirror and configured to rotate the mirror in a first direction and a second direction, a memory configured to store configuration data correlated to a direction of the mirror, and a controller. The controller is configured to determine the direction of the mirror, access the configuration data in the memory using the determined direction of the mirror, and generate a line of image data based on the accessed configuration data.

The present disclosure also describes an image forming apparatus that includes a memory configured to store image data, a mirror device comprising a mirror and configured to rotate the mirror in a first direction and a second direction, an emitter configured to transmit a laser beam to be reflected off the mirror, a sensor array configured to detect the laser beam reflected off the mirror, and a controller. The controller is configured to generate configuration data correlated to a direction of the mirror based on the detected laser beam, store the configuration data in the memory to correlate to the direction of the mirror, determine the direction of the mirror, access the configuration data in the memory using the determined direction of the mirror, and generate a line of image data based on the accessed configuration data.

In addition, the present disclosure describes a method that includes rotating a mirror included in a mirror device in a first direction and a second direction, determining a direction of the mirror, accessing configuration data in a memory using the determined direction of the mirror, wherein the configuration data corresponds to a direction of the mirror, and generating a line of image data based on the accessed configuration data.

The present invention is defined by the following claims, and nothing in this section should be taken as a limitation on those claims. The embodiments will now be described with reference to the attached drawings.

DETAILED DESCRIPTION

Figure 1:
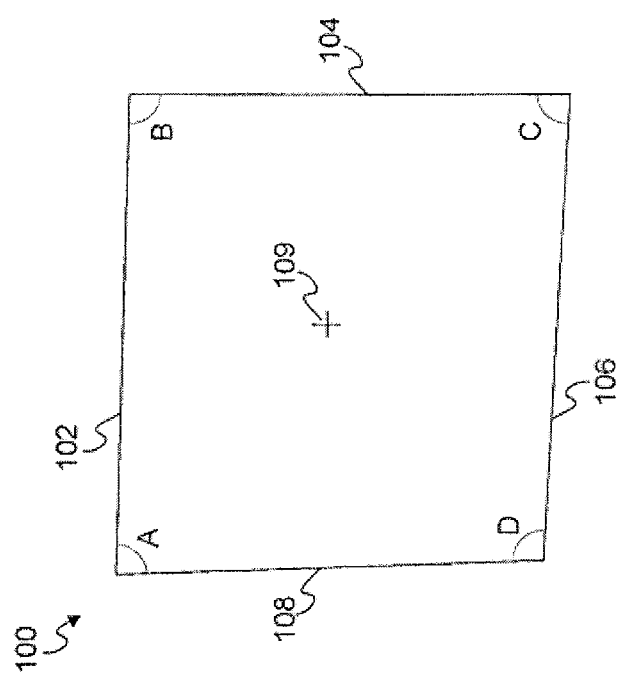
FIG. 1 illustrates an example of a polygon mirror.

As discussed in the background, the laser printer or photocopier may implement a multi-faceted rotating mirror to direct a single beam or multiple beams at the photoreceptive drum. Alternatively, the laser printer or photocopier may implement an oscillating mirror to direct a single beam or multiple beams at the photoreceptive drum. The oscillating mirror may also be referred to as a galvo mirror. Unlike the multi-faceted mirror that rotates continuously in a single direction, the oscillating mirror rotates in a first direction to write one scan line at the photoreceptive drum, and then rotates back in a second direction to write a subsequent scan line at the photoreceptive drum.

As discussed in more detail below, rotating the oscillating mirror may result in distortions and artifacts in the printed image, caused by an imperfect mirror facet in the oscillating mirror and by imperfect mechanical operation of the oscillating mirror. Image transformation reduces or eliminates distortions and artifacts in the printed image caused by imperfect mirror facets and/or caused by mechanical disturbances that occur while driving the rotation of an oscillating mirror.

Image transformation involves the manipulation of image data that is used to control exposure of a photoconductive drum by a laser. Each line of image data may be modified uniquely based on the characteristics of the facet of the mirror used for that line of image data. Each line of image data may also be modified uniquely based on a specific mechanical disturbance that occurs while rotating an oscillating mirror in a specified known direction.

The modifications to the image data may be made using configuration data. The configuration data may be indexed by the mirror facet number. The configuration data may also be indexed according to a direction of rotation of an oscillating mirror. For instance, a first index may be applied when the oscillating mirror is known to rotate in a first direction (e.g., the controller identifies that the mirror is moving in a counter-clockwise direction), and a second index may be applied when the oscillating mirror is known to rotate in a second direction (e.g., the controller identifies that the mirror is moving in a clockwise direction). The configuration data enables linear stretching or shrinking of the image, warping of the image (e.g. non-linearly), and/or shifting of the image in a direction, which may be referred to as periodic line based image transformation.

Periodic line based image transformation may also permit the image forming apparatus to operate correctly without the use of an F-θ lens or with the use of a lower quality and less expensive F-θ lens. Because of the geometry of the laser beam path, if the mirror rotates at a constant speed, the scanning speed on the image forming surface is not constant. An F-θ lens corrects the velocity of the laser beam at the image forming surface and focuses the laser beam. A lower quality and less expensive F-θ lens may only focus the laser beam. In one implementation, the F-θ lens for correcting the velocity of the laser beam may be omitted. As a result, the periodic artifacts caused by the imperfections of the mirror are more noticeable. To alleviate this problem, the velocity of the laser beam at the image forming surface may be effectively corrected using periodic line based image transformation.

Periodic line based image transformation may also permit various components of the image forming apparatus to be manufactured using lower tolerances. The components include motors, mirrors, or any components involved in writing a latent image on the photoreceptor drum. Lowering the tolerances necessary for manufacturing reduces the cost of the components. For example, the mirror may be manufactured using fly-cutting or mold and die rather than a diamond cutting tool.

Manufacturing imperfections result in a mirror having an irregular shape. An irregular shape may be defined as any shape that is not a regular polygon, or in the case of a single facet mirror, which may be used as an oscillating mirror, an irregular shape may be defined as any shape that does not provide a flat reflecting surface. A regular polygon is both equiangular, which means all angles between sides are equal, and equilateral, which means that all sides have the same length. A polygonal mirror having an irregular shape may have any two or more facets with different lengths, mirror facets that meet at different angles, or mirror facets with irregular surfaces. FIGS. 1-4 illustrate a variety of polygon mirrors with various imperfections. Although four-side polygon mirrors are shown, three-sided polygon mirrors, six-sided polygon mirrors, or eight-sided polygon mirrors may be used, and any number of sides is possible. Further, a single-sided mirror may be used.

FIG. 1 includes a polygon mirror 100 having sides 102, 104, 106, and 108 joined at angles A, B, C, and D. Sides 102, 104, 106, and 108 have the same length. However, angles A, B, C, and D are not equal. In addition, the polygon mirror 200 may have four equal angles but still have irregular sides. For example, side 102 may be the correct length. However, the lengths of the other sides 103 and 108 result in side 203 being considered an irregular facet.

The polygon mirror 100 and other polygons mirrors described are configured to rotate about an axis, such as rotation point 109, which may be the center of the polygon mirror 100, or may be offset from the center of the polygon mirror 100 by an error value. A regular polygon mounted off center results in one or more of the facets being considered irregular. In this case, even a perfect regular polygon mirror may be corrected when the perfect regular polygon mirror is not rotated at the center. Therefore, a polygon mirror having two or more facets with different distances from the center of the facet surface to the center of rotation of the polygon mirror is considered irregular or having an irregular facet.

Figure 2:
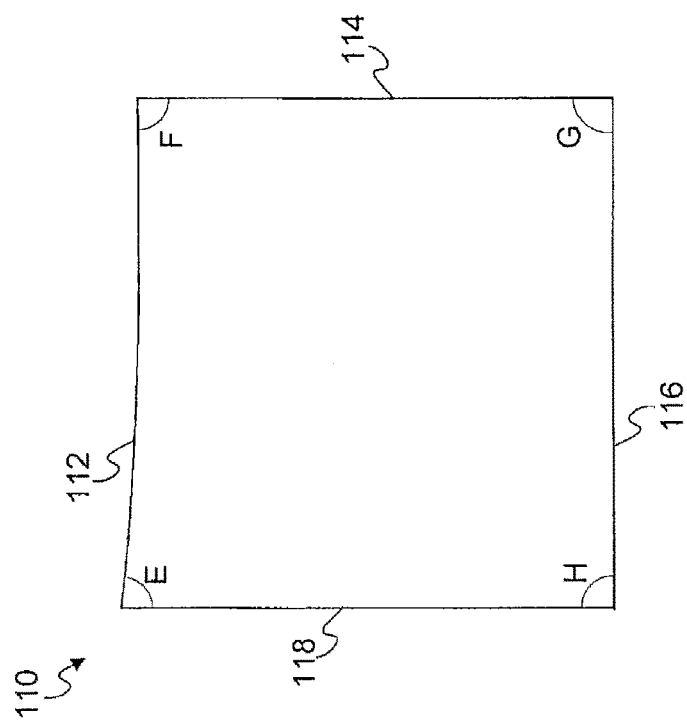
FIG. 2 illustrates a second example of a polygon mirror.

FIG. 2 illustrates a polygon mirror 110 having sides 112, 114, 116, and 118 joined at angles E, F, G, and H. Sides 114, 116, and 118 may be equal, and side 112 may have a different length. Side 112 may be warped or curved. Accordingly, angles F, G, and H may be equal to each other and different than angle E.

Figure 3:
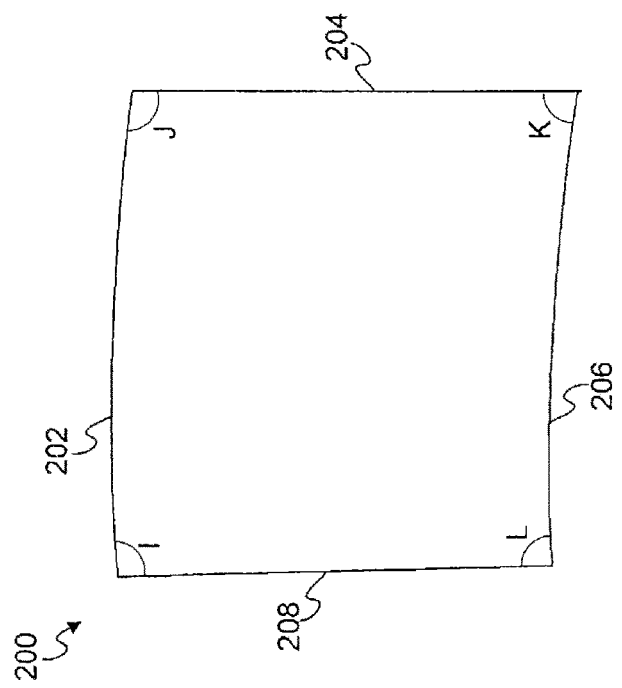
FIG. 3 illustrates a third example of a polygon mirror.
Figure 4:
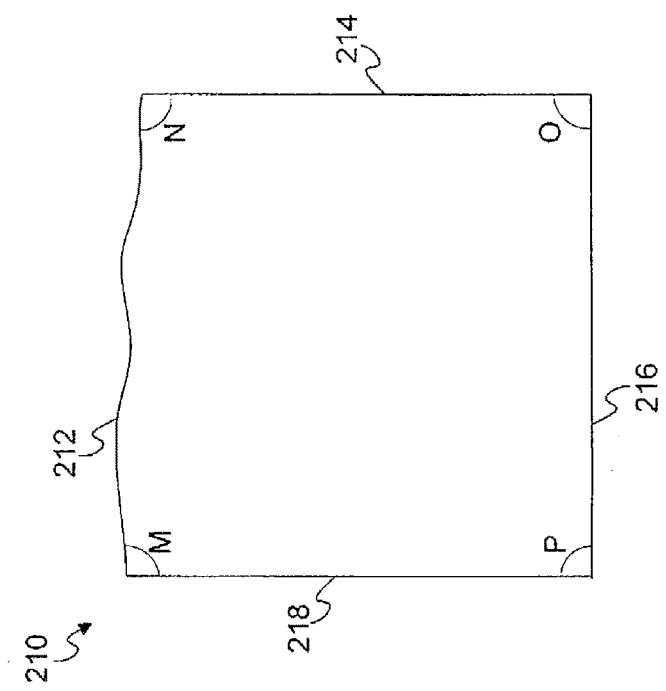
FIG. 4 illustrates a fourth example of a polygon mirror.

FIG. 3 illustrates a polygon mirror 200 having sides 202, 204, 206, and 208 joined at angles I, J, K, and L. Sides 202 and 206 may be warped or curved, and sides 204 may be straight and equilateral. Accordingly, angles I, J, K and L may be different than each other, but any two of the angles may be equal. FIG. 4 illustrates a polygon mirror 210 having sides 212, 214, 216, and 218 joined at angles M, N, O, and P. Side 212 is warped to the point it has multiple points of curvature.

Figure 5:
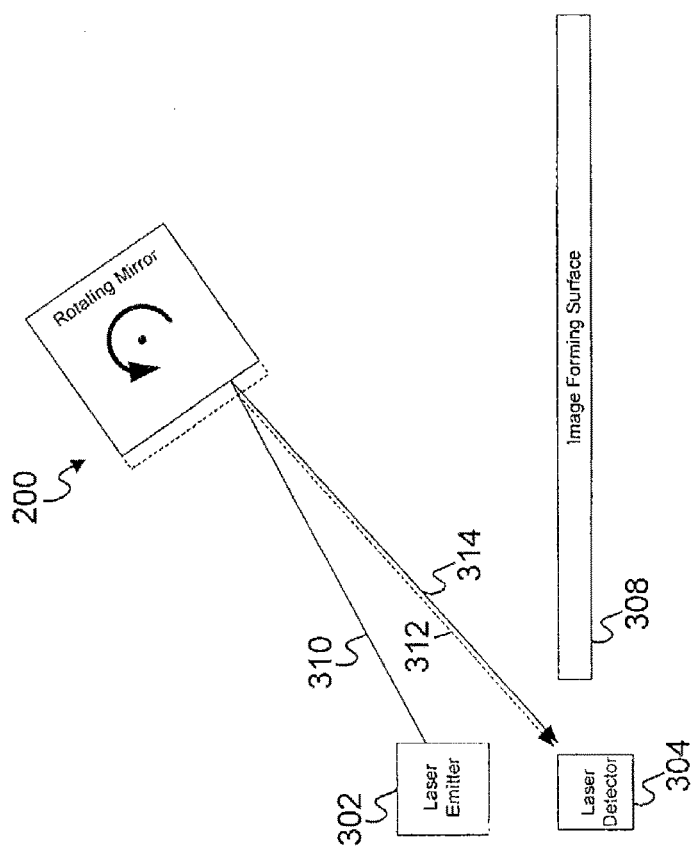
FIG. 5 illustrates a first embodiment of an image forming apparatus including one of the polygon mirrors of FIGS. 1-4.

FIG. 5 illustrates a first embodiment of an image forming apparatus including one of the polygon mirrors of FIGS. 1-4. The polygon mirror 200 is shown, but any polygon mirror may be used. FIG. 5 illustrates a single channel laser system or monochrome image forming apparatus. However, a tandem system including four or more single channel laser systems may be used. All of the lasers in a tandem system may share the polygon mirror 200. Alternatively, any two lasers may share the polygon mirror 200.

The laser system includes a laser emitter 302, a laser detector 304, and an image forming surface 308. The image forming surface 308 may be a photosensitive drum or an optical photoconductor (OPC). For ease of illustration, the remaining components are not shown. The laser emitter 302 emits a laser beam 310 which is reflected from polygon mirror 200 as reflected beam 314. The solid line on the polygon mirror 200 shows the irregular facet and the dotted lines show the ideal, regular surface of the polygon mirror 200. As discussed above, the irregular face may be of a different length or at a different angle than that expected in a regular polygon. A dotted line 312 represents the expected location of reflected beam 314 if polygon mirror 200 was a regular polygon. The reflected beam 314 arrives at laser detector 304 and begins writing to the image forming surface before dotted line 312 hypothetically would arrive if reflected from a mirror having the shape of a regular polygon.

In one implementation, the configuration data may be determined by the manufacturer or vendor with external measurement hardware and stored in memory associated with the polygon mirror 200. The external measurement hardware may measure the dimensions of the polygon mirror 200. Alternatively, the external measurement hardware may comprise an array of sensors (not shown), and the polygon mirror 200 may be used to sweep a light beam across the array of sensors for each of the facets in order to characterize the polygon mirror 200.

Figure 6:
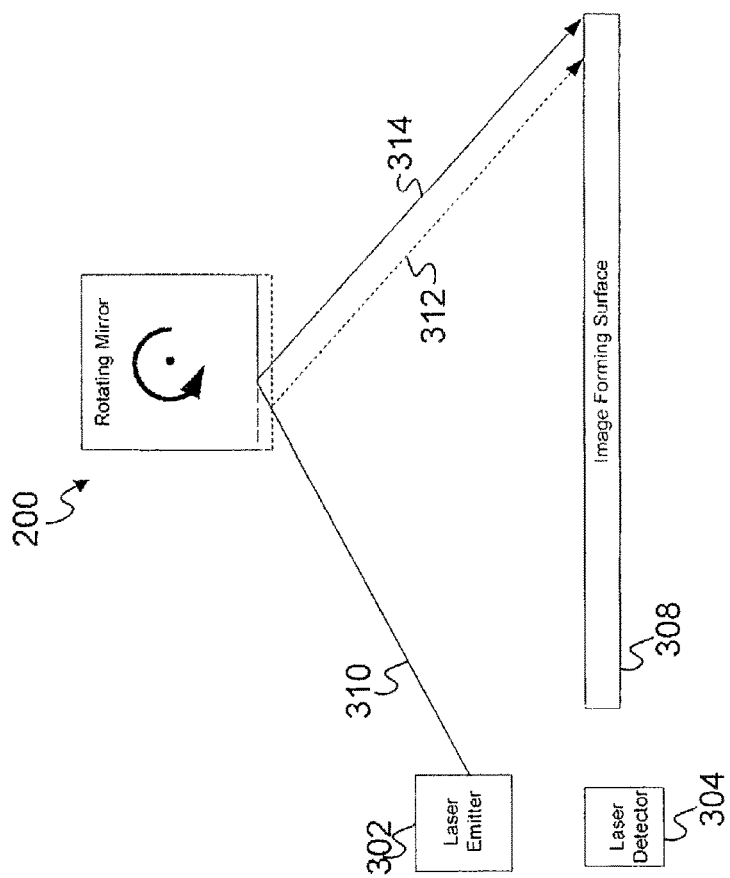
FIG. 6 illustrates another state of the image forming apparatus of FIG. 4.

FIG. 6 illustrates the image forming apparatus of FIG. 5 at a different state. The polygon mirror 200 has rotated such that reflected beam 314 is near the end of the image forming surface 308. As can be seen from a comparison of FIG. 6 and FIG. 5, the distance between reflected beam 314 and dotted line 312 increases from one side of image forming surface 308 to the other side. The distance between reflected beam 314 and dotted line 312 could also decrease, or increase and decrease in varying degrees as the reflected beam 314 sweeps across the image forming surface 308. Because the discrepancy from the ideal changes as the reflected beam 314 sweeps across the image forming surface 308, simply delaying the reflected beam 314 could not accurately correct the path of the reflected beam 314.

The discrepancy between the reflected beam 314 and the dotted line 312 may be corrected through line based image data transformation. The correction may be made in two ways. In one scenario, a signal used to modulate laser emitter 302 may be modified to account for the irregular facet of polygon mirror 200. In another scenario, the stored image data may be modified. Both implementations are discussed in detail below.

Figure 7:
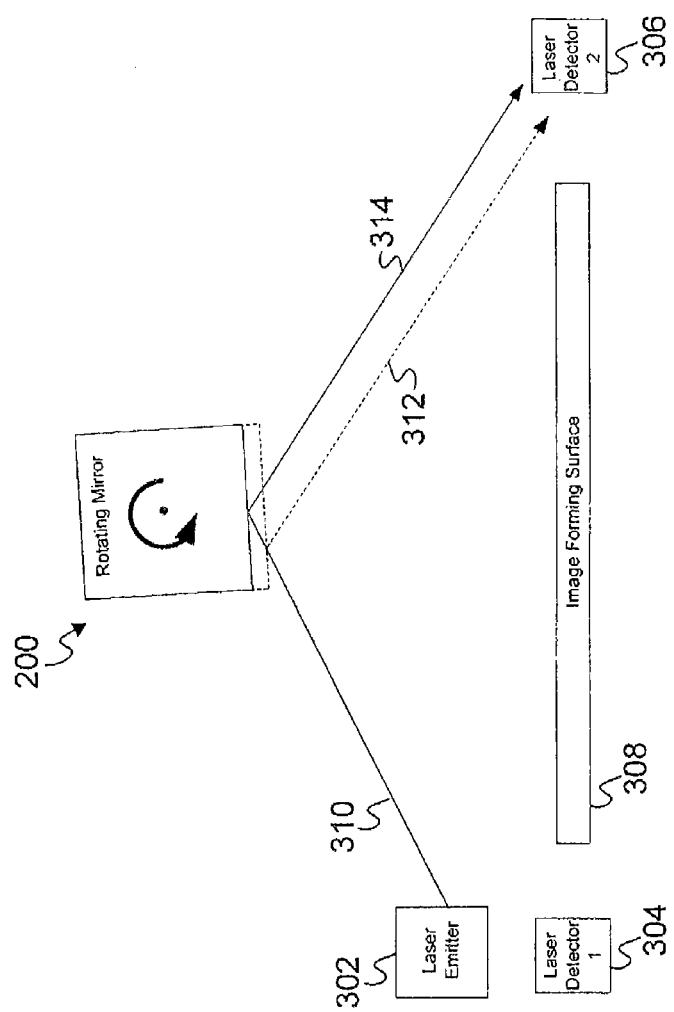
FIG. 7 illustrates a second embodiment of an image forming apparatus including at least one of the polygon mirrors of FIGS. 1-4.

FIG. 7 illustrates a second embodiment of an image forming apparatus including any of the polygon mirrors of FIGS. 1-4. The second embodiment includes all of the components discussed above with respect to the first embodiment, and includes a second laser detector 306.

In one implementation, the configuration data may be determined by the image forming apparatus using the laser detectors 304 and 306. The image forming apparatus may be configured with a calibration mode. In the calibration mode, no image data is used to modulate the laser beam. Instead, the polygon mirror 200 rotates and the reflected beam 314 sweeps across the first laser detector 304, the image forming surface 308, and the second laser detector 306. Based on the detection of the reflected beam 314, the average velocity of the sweeping reflected beam 314 is calculated.

From the average velocity of the reflected beam 314, configuration data that accounts for some irregularities in the polygon mirror 200 can be determined. For example, if the average velocity of the reflected beam 314 exceeds the expected average velocity, the configuration data indicates that the image data should be stretched. Likewise, if the average velocity of the reflected beam 314 is less that the expected average velocity, the configuration data indicates that the image data should be shrunk. Further, if the reflected beam 314 reaches the image forming surface 308 before or after an expected time, additional bits may be inserted or removed from a line of image data to translate the line of image data to affect one or both of the side margins. In these ways, the configuration data may be used to shrink, stretch, or adjust the side margins of the image data. In one alternative, calibration may occur during the image forming process (i.e., detection of one pass of the reflected beam 314 may be used to calibrate subsequent passes of the reflected beam).

Figure 8A:
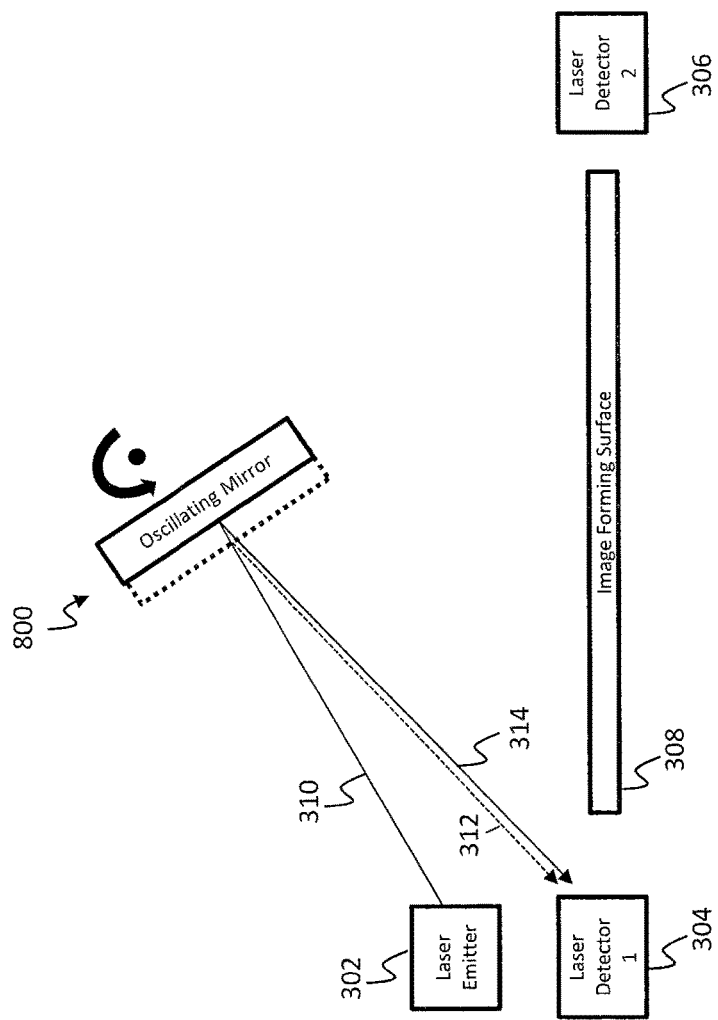
FIG. 8A illustrates a third embodiment of an image forming apparatus including at least an oscillating mirror.
Figure 8B:
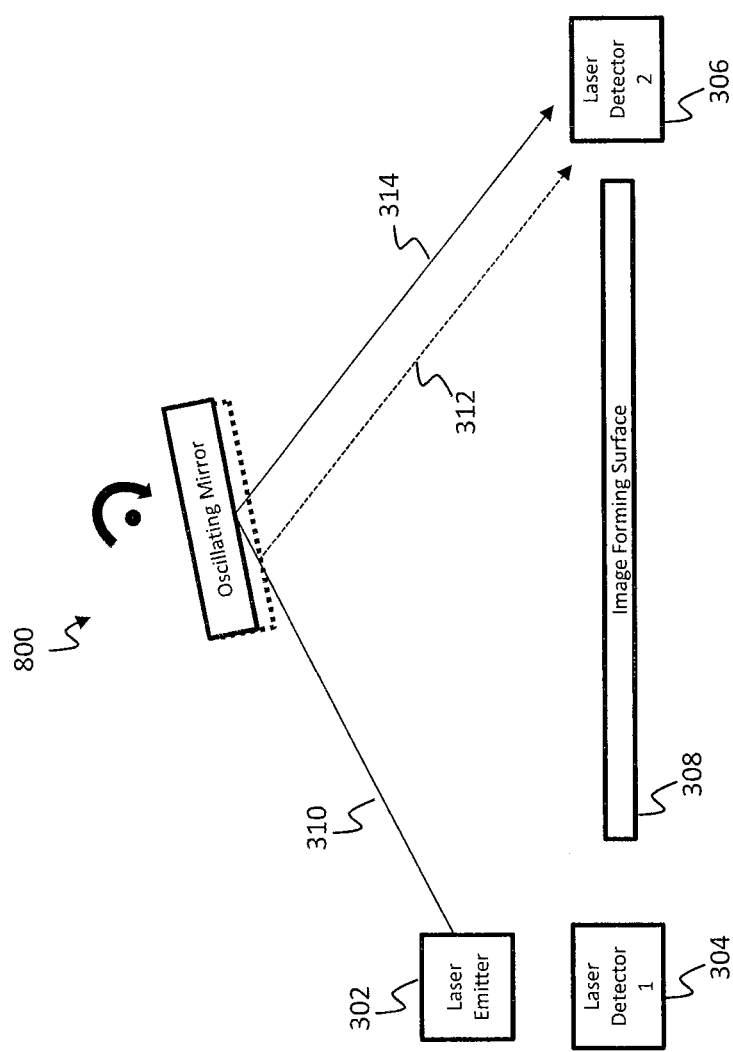
FIG. 8B illustrates a third embodiment of an image forming apparatus including at least an oscillating mirror.
Figure 8C:
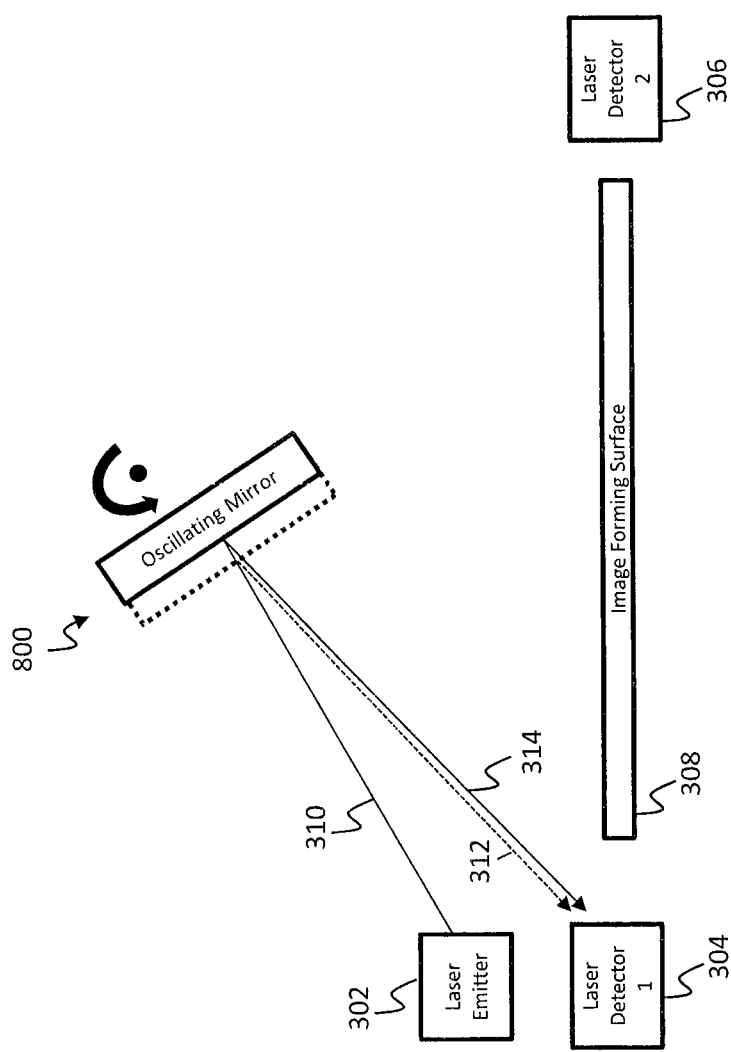
FIG. 8C illustrates a third embodiment of an image forming apparatus including at least an oscillating mirror.

FIGS. 8A-8C illustrates a third embodiment of an image forming apparatus that includes an oscillating mirror 800. One representation of an oscillating mirror 800 is shown, however, any oscillating mirror may be used. FIGS. 8A-8C illustrates a single channel laser system or monochrome image forming apparatus. However, a tandem system including four or more single channel laser systems may be used. All of the lasers in a tandem system may share the oscillating mirror 800. Alternatively, any two lasers may share the oscillating mirror 800.

Unlike the polygonal mirror 200, the oscillating mirror 800 rotates in a first direction (e.g. counter-clockwise) to reflect the laser beam 310 off the oscillating mirror 800 to expose a first line onto the image forming surface 308, and then rotates in a second direction (e.g. clockwise) to reflect the laser beam 310 off the oscillating mirror 800 to expose a second line onto the image forming surface 308. Also, unlike the polygonal mirror 200 that utilizes all of its plurality of facets as it is rotated continuously in a single direction, the oscillating mirror 800 is rotated around an axis in the two directions such that only a single facet of the oscillating mirror 800 is utilized. In this way, the oscillating mirror 800 is rotated around an axis such that the laser beam 310 will only be reflected off a single reflecting surface (e.g., facet) of the oscillating mirror 800.

As with the polygonal mirror 200, the oscillating mirror 800 may have irregularities on its reflecting surface. The irregularities on the oscillating mirror 800 may be similar to any one of the irregularities described with respect to the polygonal mirror 200 in FIGS. 1 to 4. In addition, the irregularities on the oscillating mirror 800 may be manifested on the reflecting surface as a concave curvature, convex curvature, warping, slanting in a particular direction or other like irregularities.

In addition, image discrepancies may result from mechanical disturbances during the rotation of the oscillating mirror 800. Further, the image discrepancies may be different in different directions, with the first direction potentially resulting in a different error than the second direction. Examples of mechanical disturbances may include, without limitation, an increase or decrease in a rotational velocity of the oscillating mirror 800 relative to an ideal velocity, accelerations or decelerations of the oscillating mirror 800 that are not in line with an ideal acceleration or deceleration, bumps or ticks in the motor driving the rotation of the oscillating mirror 800, rotational offsets that rotate the oscillating mirror 800 off center from a horizontal or vertical axis and other like mechanical disturbances that may occur during the rotation of the oscillating mirror 800. The examples of mechanical disturbances have been presented for illustrative purposes only, and other types of mechanical disturbances are contemplated.

When the image forming apparatus utilizes the oscillating mirror 800, the image forming apparatus accesses configuration data that is correlated to the rotational direction of the mirror in order to reduce the effects of the irregularities that are found on a reflecting surface and mechanical disturbances that may occur while the oscillating mirror is rotating in the first and second directions. To account for these characteristics of the oscillating mirror 800, a first direction of the oscillating mirror 800 may define the reflective surface of the oscillating mirror 800 as it is rotating in the first direction. Similarly, a second direction of the oscillating mirror 800 may define the reflective surface of the oscillating mirror 800 as it is rotating in the second direction. Further, configuration data may be correlated to each of the first direction and the second direction of the oscillating mirror 800. In particular, first configuration data may be indexed in the memory to correlate to the first direction, with the first configuration data configured to reduce the image discrepancies that may occur while image data is being written on the image forming surface 308 as the oscillating mirror 800 is rotating in the first direction. Second configuration data may be indexed in the memory to correlate to the second direction, with the second configuration data configured to reduce the image discrepancies that may occur while image data is being written on the image forming surface 308 as the oscillating mirror 800 is rotating in the second direction. Additional description of configuration data is provided below.

In FIGS. 8A-8C, the solid line on the oscillating mirror 800 is a representation of the reflecting surface that may include any one of the irregularities disclosed in this description, and the dotted surface line may be a representation of an ideal, regular surface of the reflecting surface.

In FIG. 8A, the laser beam 310 is reflected off the reflecting surface of the oscillating mirror 800 such that the reflected beam 314 is received by the first laser detector 304. When the reflected beam 314 is received at the first laser detector 304, this may serve as an indication that a line of image data in the first direction ("a first direction line") is to be written onto the image forming surface 308. The reflected beam 314 will then continue to write the first direction line of image data across the image forming surface 308 as the oscillating mirror 800 rotates in the first direction. The dotted line 312 is a hypothetical laser beam that would reflect off the ideal reflecting surface of the oscillating mirror 800. It is noted that although the reflected beam 314 is illustrated as leading the hypothetical dotted line 312, it is contemplated that the irregularities and mechanical disturbances may result in the reflected beam 314 following the hypothetical dotted line 312.

FIG. 8B illustrates the laser beam 310 reflecting off the reflecting surface of the oscillating mirror 800 so that the reflected beam 314 is received by the second laser detector 306. When the reflected beam 314 is received at the second laser detector 306, this may serve as an indication that the first direction line of image data which was written across the image forming surface 308 as the oscillating mirror 800 was rotated in the first direction has ended, and that a line of image data in the second direction ("a second direction line") is to be written on the image forming surface 308 as the oscillating mirror 800 is rotated in a return swing in the second direction. The reflected beam 314 will then write the second direction line of image data across the image forming surface 308 as the oscillating mirror 800 rotates in the second direction.

FIG. 8C illustrates the reflected beam 314 arriving back at the first laser detector 304 as the back swing of the oscillating mirror 800 in the second direction finishes up writing the second direction line of image data on the image forming surface 308. This oscillation movement of rotating the oscillating mirror 800 between the first direction and second direction may continue until the entire image data is finished being written onto the image forming surface 308.

So that, when the oscillating mirror 800 rotates from the first direction to the second direction, the second laser detector 306 receives the reflected beam 314 twice, a first time after the reflected beam 314 has written the first direction line of image data across the image forming surface 308 and a second time before the reflected beam 314 has written the second direction line of image data across the image forming surface 308. Likewise, when the oscillating mirror 800 rotates from the second direction to the first direction, the first laser detector 304 receives the reflected beam 314 twice, a first time after the reflected beam 314 has written the second direction line of image data across the image forming surface 308 and a second time before the reflected beam 314 has written the first direction line of image data across the image forming surface 308. In this way, the controller (discussed below) is configured to determine in which direction the oscillating mirror is rotating based on the output of the first laser detector 304 and second laser detector 306.

The offset between the reflected beam 314 and the hypothetical dotted line 312 may be caused by irregularities in the reflecting surface of the oscillating mirror 800 and/or mechanical disturbances that occur during the rotation of the oscillating mirror 800, as detailed above. While the irregularities on the reflecting surface of the oscillating mirror 800 may not be dependent on the direction of rotation of the oscillating mirror 800, the mechanical disturbances may be unique to a rotational direction of the oscillating mirror 800. Thus, the mechanical disturbances that occur while the oscillating mirror 800 is rotating in the first direction may be different from the mechanical disturbances that occur while the oscillating mirror 800 is rotating in the second direction.

Therefore, the configuration data may account for the irregularities that may reside on the reflecting surface of the oscillating mirror 800, as well as the mechanical disturbances that occur for each rotational direction of the oscillating mirror 800. For example, a first configuration data and a second configuration data corresponding to the first direction and second direction as defined above, respectively, may be stored in a memory and accessed by the controller (discussed below) in order to reduce the effects of the irregularities in the mirror and mechanical disturbances. By defining the first configuration data and second configuration data to correspond to a rotational direction of the oscillating mirror 800, the amount of configuration data needed to be indexed and stored in the memory is reduced to the number of rotational directions of the oscillating mirror (e.g., two).

The configuration data may thus be indicative of instructions to insert into or remove bits from a line of image data in order to translate the line of image data to affect one or both of the side margins of an image written on the image forming surface 308. For example, the configuration data for the first direction may be indicative of inserting into or removing bits from the first direction line of image data. Likewise, the configuration data for the second direction may be indicative of inserting into or removing bits from the second direction line of image data. Alternatively or in addition, the configuration data may be indicative of pixel rate data. In this way, the configuration data may be used to shrink, stretch, or adjust part or all of the image data, such as the side margins of the image data. For example, the configuration data for the first direction may be indicative of shrinking, stretching, or adjusting the first direction line of image data. Likewise, the configuration data for the second direction may be indicative of shrinking, stretching, or adjusting the second direction line of image data.

In one implementation, the configuration data may be determined by the manufacturer or vendor with external measurement hardware and stored in memory, such as memory 403, discussed below. The external measurement hardware may measure the dimensions of the oscillating mirror 800 for irregularities, and also study the rotational movement of the oscillating mirror 800 for the first facet and second facet to determine mechanical disturbances related to each of the facets. Alternatively, the external measurement hardware may comprise an array of sensors (not shown), and the oscillating mirror 800 may be used to sweep a light beam across the array of sensors for each of the facets in order to characterize the oscillating mirror 800.

In another implementation, the image forming apparatus may initiate a calibration mode during which sensors such as the first laser detector 304 and the second laser detector 306 may be utilized for studying the rotational movement of the oscillating mirror 800 in order to identify mechanical disturbances as the oscillating mirror 800 rotates in the first direction and second direction. Processing or controlling circuitry may then receive the studied information from the first laser detector 304 and the second laser detector 306 and determine respective configuration data for each of the first direction and second direction. Alternatively, the image forming apparatus may also include other sensors, not shown, for studying the rotational movement of the oscillating mirror 800 during a calibration mode.

Figure 9:
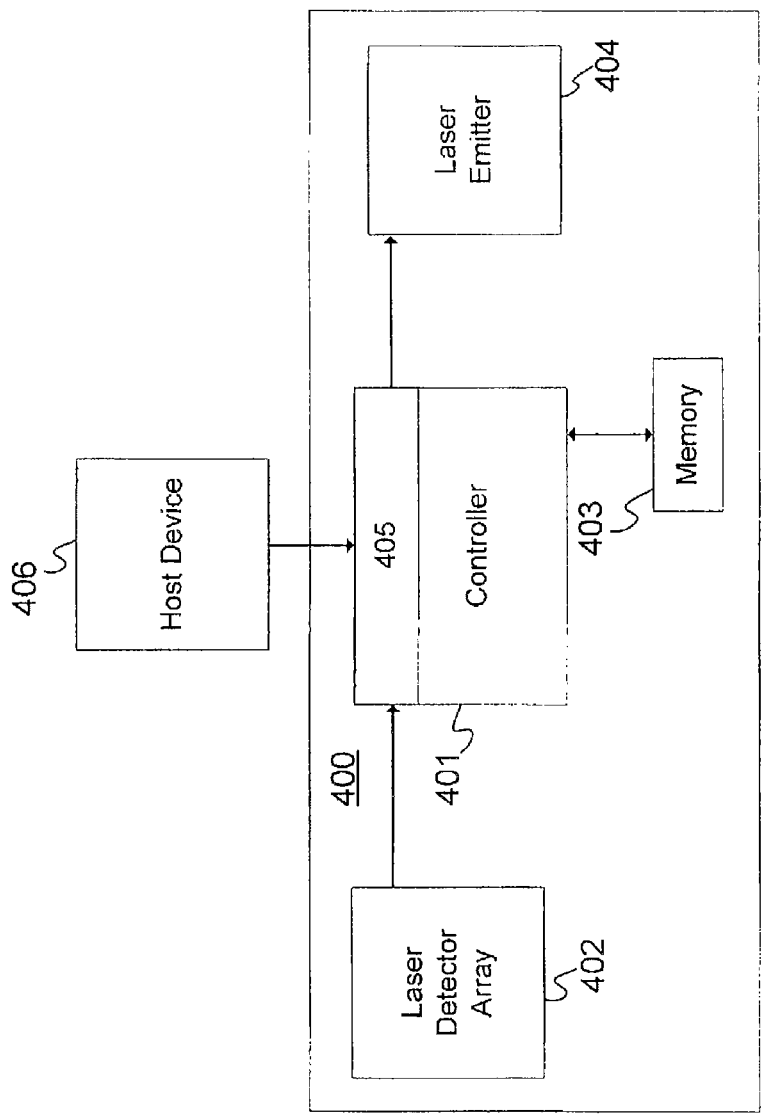
FIG. 9 illustrates a block diagram of the image forming apparatus of the first embodiment, second embodiment or third embodiment.

FIG. 9 illustrates a block diagram of the image forming system of the first embodiment, second embodiment or third embodiment. The image forming system includes an image forming apparatus 400 and a host device 406. The image forming apparatus 400 includes a laser detector array 402, a controller 401, a communication interface 405, a memory 403, and a laser emitter 404.

The memory 403 stores the configuration data. In the first embodiment, the configuration data is generated externally. In the second embodiment, the configuration data is generated by the controller 401. In the third embodiment the configuration data may be generated externally or by the controller 401. The configuration data may be indexed by facet number or by direction of the oscillating mirror. For example, a lookup table may associate each of the facets of the mirror with the facet's configuration data. For example, a line of configuration data may include a header indicating the facet number and a body including scaling data and translation data for modulating the laser beam. The configuration data may determine the pixel rate for modulating the laser beam. As another example, the lookup table may associate each direction of the mirror with the direction's configuration data. For example, a line of configuration data may include a header indicating the direction (e.g., first direction or second direction) and a body including scaling data and translation data for modulating the laser beam. The configuration data may determine the pixel rate for modulating the laser beam. The memory 403 may include registers for storing the configuration data.

The controller 401 receives image data from the host device 406. The host device 406 or the controller 401 may perform preliminary image processing, such as halftoning, formatting, image enhancement, and other operations on the image data. The image data may be stored in the memory 403, or the controller 401 may read the image data directly as received from the host device 406 by way of communication interface 405. The controller 401 accesses the configuration data from memory 403 to perform periodic line based image transformation. For example, the controller 401 may control a pixel rate of a signal used to modulate the laser beam generated by the laser emitter 404. The signal may be a pulse width modulated (PWM) signal.

The laser detector array 402 may include one laser detector as in the first embodiment, or two or more laser detectors as in the second and third embodiments. In any of the embodiments, the controller 401 may initiate the calibration mode to update or generate the configuration data. The controller 401 may initiate the calibration mode according to a predetermined schedule, after a predetermined number of sheets, at power up, or in response to a command by the user. Accordingly, the calibration mode may be repeated and the configuration data stored in memory 403 updated. An input device, such as a keyboard, a touch screen, or by way of host device 406 may provide the command to the controller 401.

In addition to generating the configuration data, the sensor data generated by laser detector array 402 may be used to determine rotating speed and location of the polygon mirror 200. This type of synchronization control senses the location of the sweeping laser beam to coordinate the control of laser emitter 404. In addition, the sensor data generated by laser detector array 402 may be used as a feedback to control the speed of the polygon mirror 200. However, line based image data transformation as described herein, is used in addition to or as an alternative to the synchronization control.

The controller 401 may include a digital signal processor, an application specific integrated circuit (ASIC), a field programmable gate array, a logical digital circuit, or other now known or later developed controller. The memory 403 may be any known type of volatile memory or non-volatile memory. The memory 403 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The host device 406 may be a personal computer, a server, a portable device such as a smart phone or a personal digital assistant (PDA), or any device capable of sending print jobs to the printer. The host device 406 may also be omitted, for example, when image forming apparatus 400 is a photocopier.

Figure 10:
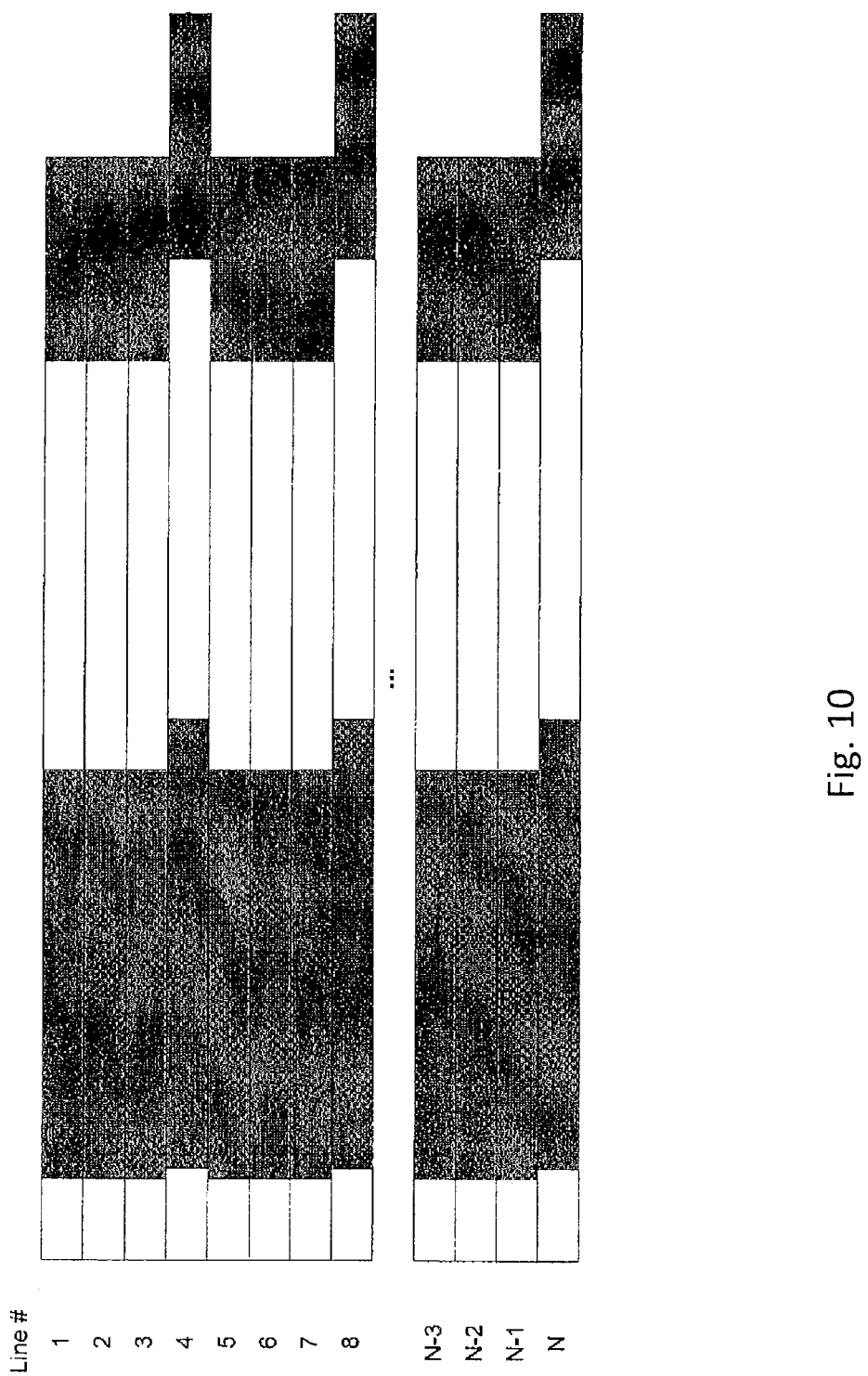
FIG. 10 illustrates a first example of a graphical representation of image data generated by the first embodiment or the second embodiment.

FIG. 10 illustrates a graphical representation of image data generated by the first embodiment or the second embodiment. The graphical representation could be the exposed latent image on the image forming surface 308. As described above, each side of the polygon mirror 200 exposes one line of the image onto the image forming surface 308. For ease of illustration, the image data used in the example of FIG. 10 includes a simple image of two single-color constant stripes. The image lines may be horizontal or vertical, depending on how the image data is oriented relative to the laser beam exposing the line on the image forming surface. Although, the lines of the image data shown in FIG. 10 are not aligned, when the image is finally printed, the irregular facets of the mirror will cause the lines of the image data to be printed in a uniform stripe or column.

The lines of the image in FIG. 10 repeat based on the number of sides of the polygon mirror. In the case of polygon mirror 200, as shown, the configuration data, which may be unique for each facet of the mirror, repeats every four lines. For example, lines 1-3, 5-7 and N-3 through N-1 illustrate the same configuration data and the same amount of translation and scaling of the image data. In one implementation, the controller 401 alters the image data stored in memory 403 for these lines in the same way. In another implementation, the pixel rate used by the controller 401 when modulating the image data for these lines for transmission to laser emitter 404 is the same.

However, lines 4, 8, and N are treated differently because the configuration data for lines 4, 8, and N is different than the other lines. Lines 4, 8, and N are stretched with respected to the other lines. This may be realized by manipulating the image data stored in memory 403. Alternatively, this may be realized by decreasing the pixel rate for lines 4, 8, and N. Example pixel rates may be in the range of 1-200 MHz (e.g., 4 MHz, 17 MHz, 20 MHz, or 150 MHz). The configuration data may indicate changes in the pixel rate from a default pixel rate, which may be expressed, for example, as percentage increases or decreases in the default pixel rate or the current pixel rate. Examples for the percentage increase or decreases may include increments of 0.1%, 1%. 2%, or 10% of the current pixel rate. The configuration data may be a piecewise linear profile that indicates where in the line of image data pixel rate changes should occur.

In addition or in the alternative, the configuration data may specify a number of additional bits that may be inserted or removed from a line of image data to translate the line of image data to affect one or both of the side margins. The number of additional bits may be calculated from the measurement of the facet of the mirror. The number of bits may be increments of 10, 50, or 100, or defined as the number of bits required to represent a calculated number of pixels.

Figure 11:
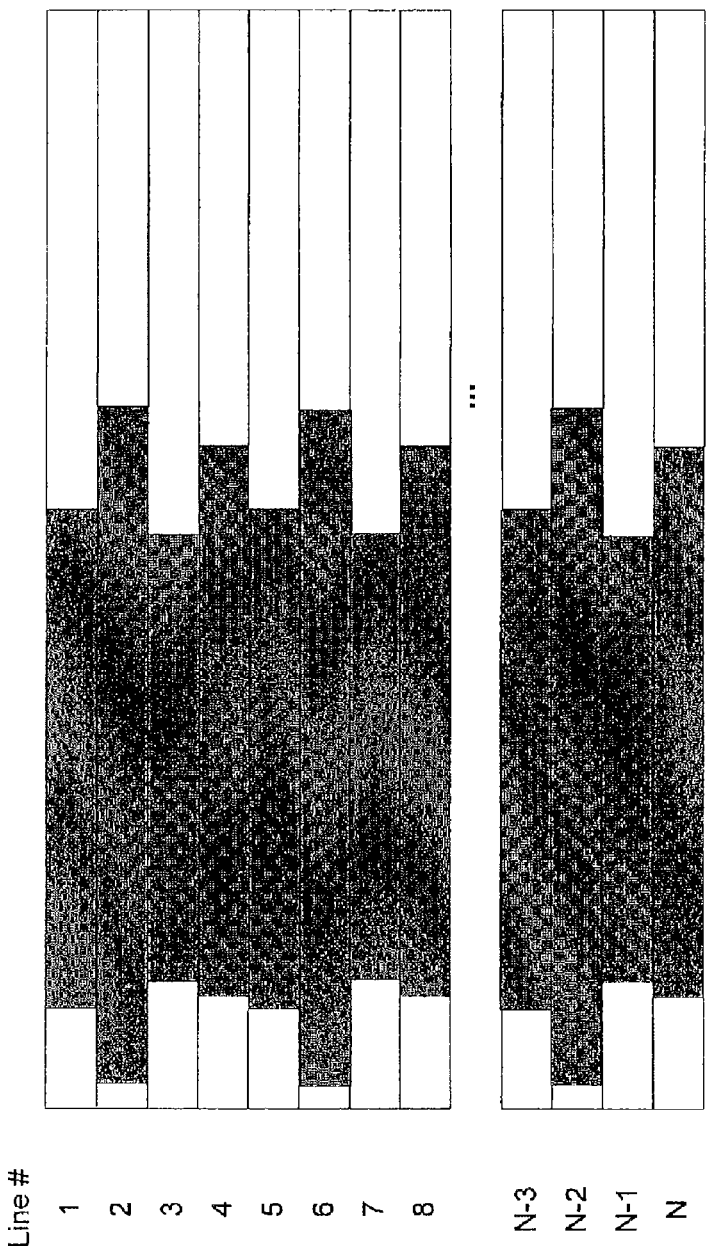
FIG. 11 illustrates a second example of a graphical representation of image data generated by the first embodiment or the second embodiment.

FIG. 11 illustrates a second example of a graphical representation of image data generated by the first embodiment or the second embodiment. The exposed latent image of FIG. 11 corresponds to a more irregular mirror than that of FIG. 10. For example, FIG. 11 may correspond to polygon mirror 202 or polygon mirror 212 as discussed above.

Each side of the polygon mirror 202 exposes one line of the image onto the image forming surface 308. For ease of illustration, the image data used in the example of FIG. 10 includes only one single-color constant stripe. FIG. 11 shows that the configuration data repeats every four lines, and each of lines 1, 2, 3, and 4 has different configuration data. For example, with respect to line 1, line 2 has been stretched, line 3 has been shrunk, and line 4 has been stretched and both side margins adjusted. Therefore, each of the lines of the image was created using a different pixel rate or the image data was manipulated differently before converting to a modulation signal for laser emitter 404. In addition, the side margins may be adjusted by inserting pixels or removing pixels from the image data. Through the manipulation of the image data, scaling and/or translations may be performed on a line by line basis according to the associated facet of the polygon mirror 202.

Figure 12:
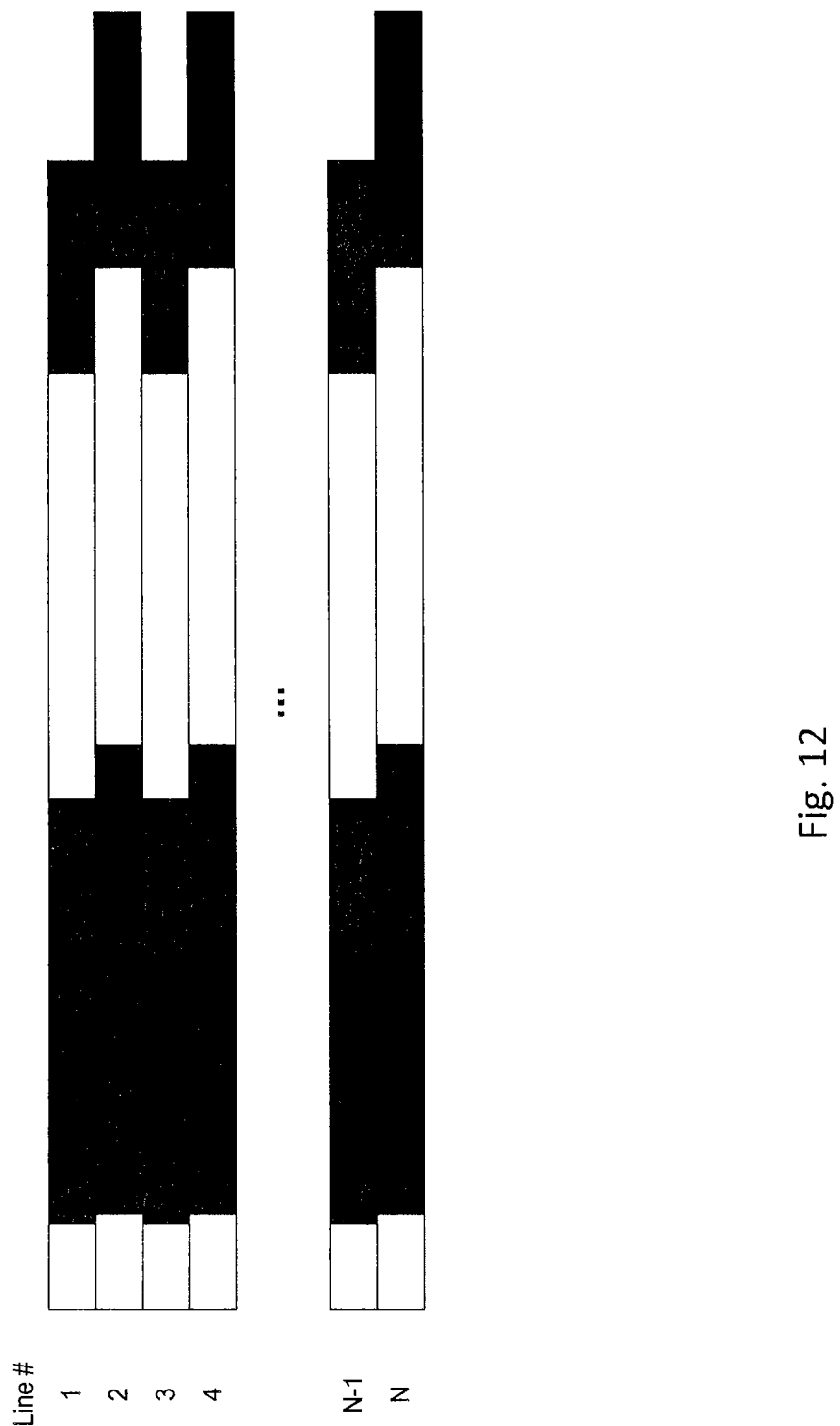
FIG. 12 illustrates an example of a graphical representation of image data generated by the third embodiment.

FIG. 12 illustrates an example of a graphical representation of image data generated by the third embodiment that utilizes the oscillating mirror 800. The graphical representation may be the exposed latent image on the image forming surface 308. The image lines may be horizontal or vertical, depending on how the image data is oriented relative to the laser beam exposing the line on the image forming surface. Although the lines of the image data shown in FIG. 12 are not aligned, when the image is finally printed, the irregularities of the oscillating mirror 800 and mechanical disturbances will cause the lines of the image data to be printed in a uniform stripe or column.

The lines of the image in FIG. 12 repeat based on the two directions of the oscillating mirror 800. Therefore, in the case of the oscillating mirror 800 having a first direction and a second direction, as described, the configuration data is seen to repeat a same modification on the image data every other line. So that, the odd numbered image lines illustrate the same configuration data and the same amount of translation and scaling of the image data. Similarly, the even numbered image lines illustrate the same configuration data and the same amount of translation and scaling. For illustrative purposes, the odd numbered lines may be considered to correspond to the first direction of the oscillating mirror 800, and the even numbered lines may be considered to correspond to the second direction of the oscillating mirror 800.

The configuration data corresponding to the odd numbered lines, or first direction, may be realized by manipulating the image data stored in memory 403. And similarly the configuration data corresponding to the even numbered lines, or second direction, may also be realized by manipulating the image data stored in memory 403. Alternatively, the manipulation on the image data may be realized by decreasing or increasing the pixel rate. Example pixel rates may be in the range of 1-200 MHz (e.g., 4 MHz, 17 MHz, 20 MHz, or 150 MHz). The configuration data may indicate changes in the pixel rate from a default pixel rate, which may be expressed, for example, as percentage increases or decreases in the default pixel rate or the current pixel rate. Examples for the percentage increase or decreases may include increments of 0.1%, 1%, 2%, or 10% of the current pixel rate. The configuration data may be a piecewise linear profile that indicates where in the line of image data pixel rate changes should occur.

In addition or in the alternative, the configuration data may specify a number of additional bits that may be inserted or removed from a line of image data to translate the line of image data to affect one or both of the side margins. The number of additional bits may be calculated from the measurement of the facet of the mirror. The number of bits may be increments of 10, 50, or 100, or defined as the number of bits required to represent a calculated number of pixels.

Figure 13:
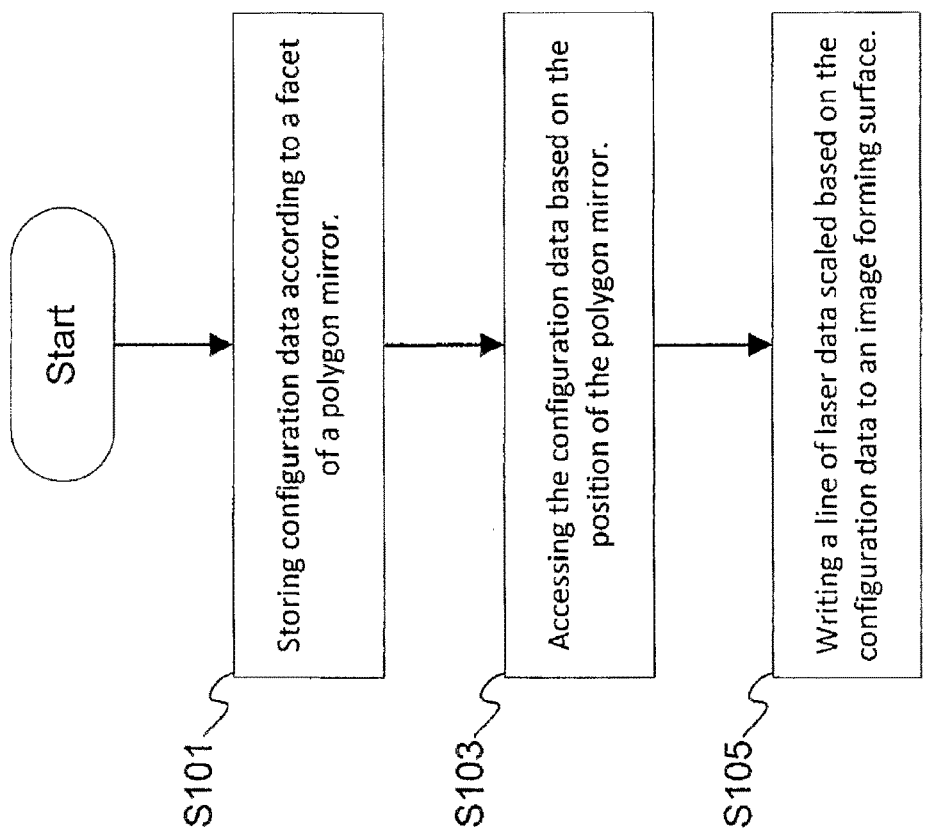
FIG. 13 illustrates a flow chart for periodic line based image transformation.

FIG. 13 illustrates a flow chart for periodic line based image transformation. At S101, configuration data is stored and indexed according to facet of a polygon mirror. The configuration data may be generated by the image forming apparatus or the configuration data may be generated ahead of time and stored in memory 403. At S103, the controller 401 accesses the configuration data based on the position of the polygon mirror and/or the active facet of the polygon mirror. The position of the polygon mirror may be known through the detection of a laser beam reflected from the polygon mirror. Alternatively, the controller 401 may control the rotation of the polygon mirror through a motor by using the configuration data as feedback on the speed of the motor's rotational speed.

At S105, the controller 401 controls the laser emitter 404 to write a line of laser data scaled based on the configuration data to the image forming surface 308. The laser data may have been scaled or adjusted in a variety of ways. In one example, the controller 401 may have processed image data received from host device 406 and generated laser data from the processed image data. The processing of image data may involve translating the image data, inserting or removing pixels into a line of the image data, or using lookup table or interpolation techniques for shrinking, stretching, or translating a line of image data. The controller 401 may have scaled the laser data by controlling a pixel rate at which data is sent to the laser emitter 404.

Figure 14:
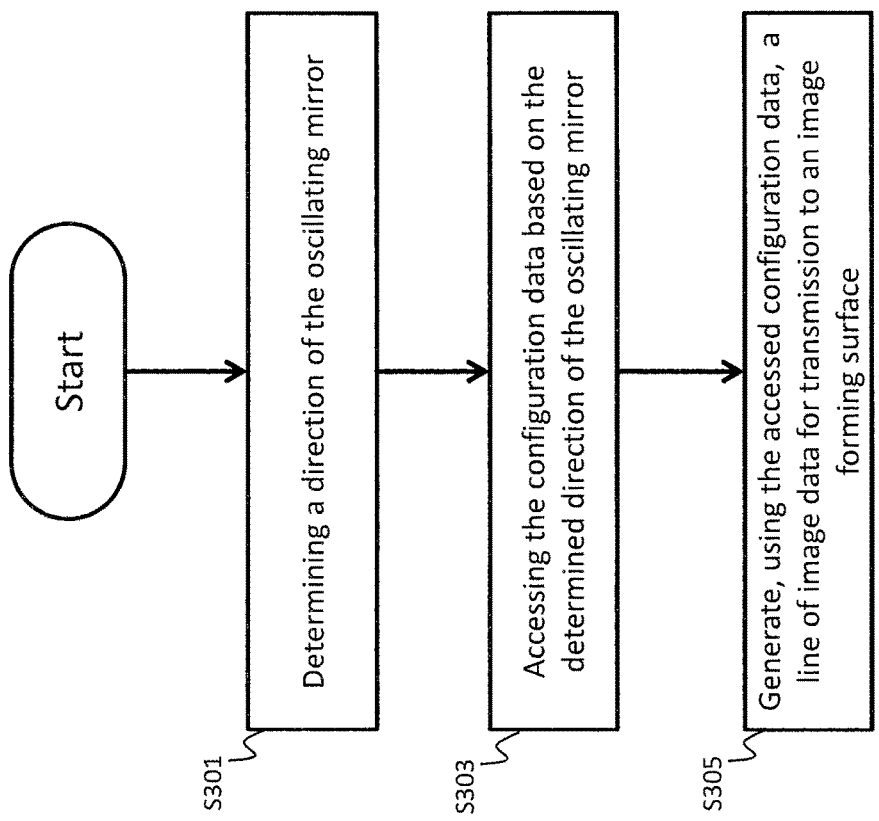
FIG. 14 illustrates a flow chart for periodic line based image transformation.

FIG. 14 illustrates a flow chart for periodic line based image transformation where an oscillating mirror is utilized. At S301, a direction of the oscillating mirror is determined. As discussed above, one or more sensors may be used to determine the direction of oscillation of the mirror. For example, the controller 401 is configured to receive the input from the first laser detector 304 and the second laser detector 306. Based on the sensor input from the first laser detector 304 and the second laser detector 306, the controller is configured to determine the direction of the oscillating mirror, such as whether the oscillating mirror is traveling in the first direction or the second direction. In this way, the controller 401 is configured to determine the rotation direction of the oscillating mirror through the detection of a laser beam reflected from the oscillating mirror. Alternatively, the controller 401 may be configured to determine the direction of the oscillating mirror based on input from the motor (or other mechanical device) that oscillates the mirror. For example, the motor configured to oscillate the oscillating mirror 800 may be configured to generate an input to controller 401, with the input being used by the controller to determine the direction of the oscillating mirror 800.

At S303, in response to determining the direction of the oscillating mirror, the configuration data corresponding to the determined direction is accessed. As discussed above, configuration data may be stored and correlated to a direction of the oscillating mirror. The configuration data may be generated by the image forming apparatus or may be generated at manufacture of the image forming apparatus and stored in memory 403.

At S305, the controller 401 is configured to generate the line of image data using the accessed configuration data, so that the generated line of image data may be written using a laser onto the image forming surface 308. For example, the processor may modify part (or all) of the line of image data based on the accessed configuration data. For instance, the controller may control the laser emitter 404 based on the accessed configuration data in order to scale the line of laser data. The laser data may be scaled or adjusted in a variety of ways. In one example, the controller 401 may process image data received from host device 406 and generate laser data from the processed image data. The processing of image data may involve translating the image data, inserting or removing pixels into a line of the image data, or using lookup table or interpolation techniques for shrinking, stretching, or translating a line of image data. The controller 401 may scale the laser data by controlling a pixel rate at which data is sent to the laser emitter 404.

Figure 15:
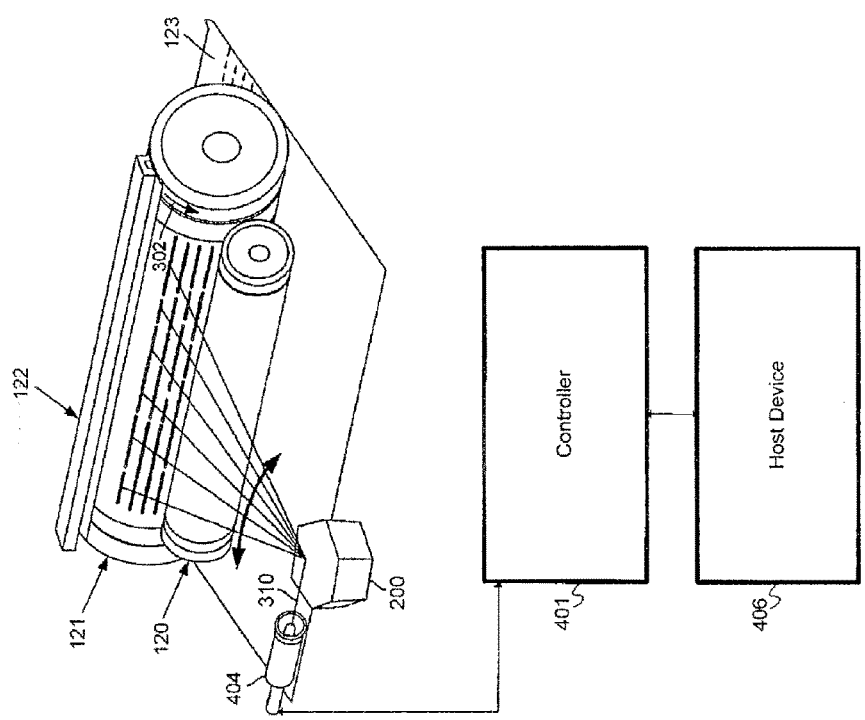
FIG. 15 illustrates another view of the image forming apparatus of the first embodiment, second embodiment or third embodiment.

FIG. 15 illustrates another view of the image forming apparatus of the first, second or third embodiments. The term image forming apparatus includes at least laser printers, photocopiers, and combinations thereof such as multi-function printers (MFPs). In the case of printing functions, the image data is received from host device 406. In the case of copying functions, the image data is received from a scan sensor, which may include a light source and a charged couple device (CCD) array (not shown). Any of the implementations of periodic line based image transformation may be performed by any image forming apparatus.

The controller 401 controls laser emitter 404 to direct a laser beam 310 to polygon mirror 200 to expose portions of photoreceptor drum 121 which has been charged by charging electrode 14. During the irradiation of the laser beam 310 on the photoconductive drum 121, the laser is turned on and off according to the laser data, which creates an electrostatic image. The size of each pixel is determined by the width of the pulse driving the laser. Even though the polygon mirror 200 may be accurately controlled at a constant speed, the geometry of the path of the laser beam 310 results in slight variations of the size of the pixels based on location on photoconductive drum 121. An F-θ lens may be used correct these variations. However, when no F-θ lens is used, as shown in FIG. 12, or a F-θ lens that does not correct for velocity is used, the periodic line based image transformation discussed above may be used to correct for the periodic artifacts created by the irregular polygon mirror 200. Also, a collimator lens may be used in combination with periodic line based image transformation to provide beam focusing for the laser beam even without the use of an F-θ lens.

A toner coated roller 120 delivers toner to the photoreceptor drum 121, and the oppositely charged toner adheres to the electrostatic image. The toner is delivered to recording medium 123 and fixed by a heating roller (not shown). Arrow 302 indicates the rotational direction of the photoreceptor drum 121.

Instructions for performing periodic line based image transformation in the process discussed above may be stored on any computer readable medium. As used herein, a "computer readable medium" includes, but is not limited to, non-volatile media, and volatile media. Non-volatile media may include, for example, optical disks, and magnetic disks. Volatile media may include, for example, semiconductor memories, and dynamic memory. The computer readable medium may be any non-transitory medium. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Instructions for instructing a device in the process discussed above may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

Although FIG. 15 is illustrated with the polygon mirror 200, the image forming apparatus may be configured to replace the polygon mirror 200 with the oscillating mirror 800 according to the third embodiment. When utilizing the oscillating mirror 800, the oscillating mirror 800 is configured to rotate in the oscillating manner as described in detail above. Also, the calibration data may be indexed according to the third embodiment as described in detail above. Other aspects of the image forming apparatus may be considered to be the same whether it is utilizing the polygon mirror 200 or the oscillating mirror 800.

Although specific embodiments have been described and illustrated, the invention is not to be limited to the specific forms or arrangements of parts so described and illustrated. The scope of the invention is to be defined by the claims appended hereto and their equivalents. It is intended that the foregoing detailed description be understood as an illustration of selected forms that the invention can take and not as a definition of the invention. It is only the following claims, including all equivalents, which are intended to define the scope of this invention.

What is claimed is:
1. An apparatus comprising:
 a mirror device comprising a mirror and configured to move the mirror wherein the mirror comprises at least one facet configured to reflect a beam;
 a memory configured to store configuration data correlated to the mirror, wherein the configuration data is determined externally by external measurement hardware to compensate, at least partly for velocity of the reflected beam due to at least a part of a distortion caused by a non-uniformity in the mirror;
 at least one calibration sensor; and a controller in communication with the memory and the at least one calibration sensor, the controller configured to:
  access, from the memory, the configuration data correlated to the mirror;
  determine whether to update the configuration data;
  in response to determining to update the configuration data:
    receive data from the at least one calibration sensor; and
    generate updated configuration data based on the data from the at least one calibration sensor that account for the non-uniformity in the mirror;
  generate a plurality of lines of an image; and
  in order to correct at least the part of the distortion caused by the non-uniformity in the mirror, based on the updated configuration data:
    (i) add or remove a number of bits respectively to or from one or more of the generated plurality of lines of the image, and
    (ii) stretch or shrink one or more of the generated plurality of lines of the image by using a different pixel rate.

2. The apparatus of claim 1, wherein the controller is configured to determine whether to update the configuration data according to a predetermined schedule, after a predetermined number of sheets, at power up, or in response to a command by a user.

3. The apparatus of claim 1, wherein the mirror device is configured to oscillate the mirror in a first rotational direction and a second rotational direction that opposes the first rotational direction.

4. The apparatus of claim 3, wherein the memory is configured to store first configuration data correlated to the first rotational direction and second configuration data correlated to the second rotational direction;
  wherein the controller is configured to access one of the first configuration data or the second configuration data based on the determined rotational direction of the mirror; and
  wherein the controller is configured to stretch or shrink one or more of the generated plurality of lines of the image by scaling a given line of the image.

5. The apparatus of claim 3, wherein the mirror device comprises a motor;
  wherein first configuration data is configured to at least partly compensate for one or more errors associated with operation of the motor to move the mirror in the first rotational direction; and
  wherein second configuration data is configured to at least partly compensate for one or more errors associated with operation of the motor to move the mirror in the second rotational direction.

6. The apparatus of claim 3, wherein first configuration data includes a scale factor having a first pixel rate associated with the first rotational direction, and
  wherein second configuration data includes a second pixel rate associated with the second rotational direction, wherein the first pixel rate is different than the second pixel rate.

7. The apparatus of claim 3, further comprising:
  a sensor configured to generate sensor data based on a laser beam reflected from the mirror and configured to communicate with the controller; and
  wherein the controller is configured to determine the rotational direction of the mirror based on the sensor data.

8. The apparatus of claim 3, wherein the controller is further configured to:
  determine the plurality of lines of the image will be generated to be reflected off the mirror while the mirror oscillates in one of the first rotational direction or second rotational direction, and
  wherein the plurality of lines of image are generated to be reflected off the mirror while the mirror oscillates in one of the first rotational direction or second rotational direction based on the determination.

9. An image forming apparatus comprising:
  a memory configured to store image data;
  a mirror device comprising a mirror and configured to move the mirror wherein the mirror comprises at least one facet configured to reflect a laser beam;
  an emitter configured to transmit the laser beam to be reflected off the mirror;
  a sensor array configured to detect the laser beam reflected off the mirror; and
  a controller configured to:
    access configuration data correlated to a direction of the mirror based on the detected laser beam, wherein the configuration data is determined externally by external measurement hardware to compensate, at least partly for velocity of the reflected laser beam due to at least a part of a distortion caused by a non-uniformity in the mirror;
    store the configuration data in the memory to the mirror;
    access, from the memory, the configuration data correlated to the mirror;
    determine whether to update the configuration data;
    in response to determining to update the configuration data:
      receive data from a calibration sensor; and
      generate updated configuration data based on the data from the calibration sensor that account for the non-uniformity in the mirror;
    generate a plurality of lines of an image; and
    in order to correct at least the part of the distortion caused by the non-uniformity in the mirror, based on the updated configuration data:
      (i) add or remove a number of bits respectively to or from one or more of the generated plurality of lines of the image, and
      (ii) stretch or shrink one or more of the generated plurality of lines of the image by using a different pixel rate.

10. The apparatus of claim 9, wherein the mirror device is configured to oscillate the mirror in a first rotational direction and a second rotational direction that opposes the first rotational direction.

11. The apparatus of claim 10, wherein the memory is configured to store first configuration data correlated to the first rotational direction and second configuration data correlated to the second rotational direction;
  wherein the controller is configured to access one of the first configuration data or the second configuration data based on the determined rotational direction of the mirror.

12. The apparatus of claim 11, wherein the controller is configured to stretch or shrink the one or more generated plurality of lines of the image by scaling a given line of the image based on the accessed one of the first configuration data or the second configuration data.

13. The image forming apparatus of claim 10, wherein the mirror device comprises a motor;

wherein first configuration data is configured to at least partly compensate for one or more errors associated with operation of the motor to move the mirror in the first rotational direction; and wherein second configuration data is configured to at least partly compensate for one or more errors associated with operation of the motor to move the mirror in the second rotational direction.

14. A method comprising:

moving a mirror included in a mirror device wherein the mirror comprises at least one facet configured to reflect a beam;

accessing, from a memory, configuration data-correlated to the mirror, wherein the configuration data is determined externally by external measurement hardware to compensate, at least partly for velocity of the reflected beam due to at least a part of a distortion caused by a non-uniformity in the mirror;

determining whether to update the configuration data;

in response to determining to update the configuration data:
  receiving data from a calibration sensor; and
  generating updated configuration data based on the data from the calibration sensor that account for the non-uniformity in the mirror;

generating a plurality of lines of an image; and in order for correcting at least the part of the distortion caused by the non-uniformity in the mirror, based on the updated configuration data:
  (i) adding or removing a number of bits respectively to or from one or more of the generated plurality of lines of the image, and
  (ii) stretching or shrinking one or more of the generated plurality of lines of the image using a different pixel rate.

15. The method of claim 14, wherein the mirror device is configured to oscillate the mirror in a first rotational direction and a second rotational direction that opposes the first rotational direction.

16. The method of claim 15, wherein first configuration data correlates to the first rotational direction and second configuration data correlates to the second rotational direction;

wherein accessing the configuration data comprises accessing one of the first configuration data or the second configuration data from the memory based on the determined rotational direction of the mirror.

17. The method of claim 16, wherein stretch or shrink the one or more generated plurality of lines of the image comprises scaling a given line of the image based on the accessed one of the first configuration data or the second configuration data.

18. The method of claim 15, wherein first configuration data is configured to at least partly compensate for one or more errors associated with an operation of a motor included in the mirror device to move the mirror in the first rotational direction; and wherein second configuration data is configured to at least partly compensate for one or more errors associated with an operation of the motor included in the mirror device to move the mirror in the second rotational direction.

19. The method of claim 15, wherein first configuration data includes a scale factor having a first pixel rate associated with the first rotational direction, and wherein second configuration data includes a second pixel rate associated with the second rotational direction, wherein the first pixel rate is different than the second pixel rate.

20. The method of claim 15, further comprising:

receiving, at a sensor, a laser beam reflected off the mirror;

generating sensor data based on the reflected laser beam; and determining the rotational direction of the mirror based on the sensor data.

* * * * *